(12) United States Patent
Ustarroz-Calonge et al.

(10) Patent No.: US 11,765,377 B2
(45) Date of Patent: *Sep. 19, 2023

(54) ALPHA CHANNEL PREDICTION

(71) Applicant: GOOGLE LLC, Mountain View, CA (US)

(72) Inventors: Maryla Ustarroz-Calonge, Paris (FR); Vincent Rabaud, Paris (FR)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,593

(22) Filed: Nov. 28, 2022

(65) Prior Publication Data

US 2023/0090481 A1 Mar. 23, 2023

Related U.S. Application Data

(63) Continuation of application No. 17/354,562, filed on Jun. 22, 2021, now Pat. No. 11,528,498.

(30) Foreign Application Priority Data

Jul. 7, 2020 (EP) ..................................... 20305773

(51) Int. Cl.
*H04N 19/503* (2014.01)
*H04N 19/186* (2014.01)
(Continued)

(52) U.S. Cl.
CPC ............. *H04N 19/503* (2014.11); *G06T 9/00* (2013.01); *H04N 19/186* (2014.11); *H04N 19/20* (2014.11); *H04N 19/44* (2014.11)

(58) Field of Classification Search
CPC .......... G06T 9/00; H04N 19/20; H04N 19/44; H04N 19/186; H04N 19/503; H04N 19/70;
(Continued)

(56) References Cited

U.S. PATENT DOCUMENTS

| 5,748,789 A | 5/1998 | Lee et al. |
| 6,707,459 B1 * | 3/2004 | Graves ..................... G09G 5/02 345/604 |
| 2007/0053423 A1 | 3/2007 | Uro |

FOREIGN PATENT DOCUMENTS

JP  2003087572 A  3/2003

OTHER PUBLICATIONS

Touradj Ebrahimi et al. "Report of Ad hoc group on core experiments on content-based coding and access in MPEG-4 video", MPEG Meeting; Mar. 25-29, 1996 (Year: 1996).*

(Continued)

*Primary Examiner* — Ayman A Abaza
(74) *Attorney, Agent, or Firm* — Young Basile Hanlon & MacFarlane, P.C.

(57) ABSTRACT

Image coding using alpha channel prediction may include generating a reconstructed image using alpha channel prediction and outputting the reconstructed image. Generating the reconstructed image using alpha channel prediction may include decoding reconstructed color channel values for a current pixel expressed with reference to first color space, obtaining color space converted color channel values for the current pixel by converting the reconstructed color channel values to a second color space, obtaining an alpha channel lower bound for an alpha channel value for the current pixel using the color space converted color channel values, generating a candidate predicted alpha value for the current pixel, obtaining an adjusted predicted alpha value for the current pixel using the candidate predicted alpha value and the alpha channel lower bound, generating a reconstructed pixel for the current pixel using the adjusted predicted alpha value, and including the reconstructed pixel in the reconstructed image.

20 Claims, 8 Drawing Sheets

(51) Int. Cl.
*H04N 19/20* (2014.01)
*H04N 19/44* (2014.01)
*G06T 9/00* (2006.01)

(58) Field of Classification Search
CPC . H04N 19/159; H04N 19/1883; H04N 19/189
USPC ................................................. 375/240.12
See application file for complete search history.

(56) References Cited

OTHER PUBLICATIONS

Touradj Ebrahimi et al.; "Report of Ad hoc group on core experiments on content based coding and aceess in MPEG-4 video"; MPEG Meeting, Mar. 25, 1996; 126 pages.
Aldus Developers Desk; Tiff 6.0 Specification; Jun. 3, 1992; 122 pages.
European Search Report for EP application No. 20305773.2 dated Dec. 7, 2020, 8 pages.
"Alpha Compositing"; Wikipedia article dated Jun. 14, 2020; retreived from the internet on Jun. 21, 2021: https:/web.archive.org/web/20200703033144/https://en.wikipedia.org/wiki/Alpha_compositing.

* cited by examiner

ALPHA CHANNEL PREDICTION

CROSS-REFERENCE TO RELATED APPLICATION(S)

This application claims priority to and the benefit of U.S. patent application Ser. No. 17/354,562, filed Jun. 22, 2021, the entire disclosure of which is hereby incorporated by reference.

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using alpha channel prediction.

SUMMARY

This application relates to encoding and decoding of image data, video stream data, or both for transmission or storage. Disclosed herein are aspects of systems, methods, and apparatuses for encoding and decoding using alpha channel prediction.

An aspect is a method for image coding using alpha channel prediction. Image coding using alpha channel prediction may include generating a reconstructed image using alpha channel prediction and outputting the reconstructed image. Generating the reconstructed image using alpha channel prediction may include obtaining reconstructed color channel values for a current pixel of the current image expressed with reference to first color space, obtaining color space converted color channel values for the current pixel by converting the reconstructed color channel values to a second color space, obtaining an alpha channel lower bound for an alpha channel value for the current pixel using the color space converted color channel values, generating a candidate predicted alpha value for the current pixel, obtaining an adjusted predicted alpha value for the current pixel using the candidate predicted alpha value and the alpha channel lower bound, generating a reconstructed pixel for the current pixel using the adjusted predicted alpha value, and including the reconstructed pixel in the reconstructed image.

Another aspect is a method for image coding using alpha channel prediction. Image coding using alpha channel prediction may include generating an encoded image using alpha channel prediction and outputting an output bitstream. Generating the encoded image using alpha channel prediction may include identifying a current pixel from an input image, wherein the current pixel includes input color channel values, wherein the input color channel values are expressed with reference to first color space, and wherein the input color channel values include an input alpha channel value, obtaining pre-multiplied color channel values for the pixel using the input color channel values, obtaining reconstructed color values for the pixel using the pre-multiplied color channel values, wherein the reconstructed color channel values are expressed with reference to second color space, obtaining color space converted color channel values for the current pixel by color space converting the reconstructed color channel values to the first color space, obtaining an alpha channel lower bound for a reconstructed alpha channel value for the current pixel using the color space converted color channel values, generating a candidate predicted alpha value for the current pixel, obtaining an adjusted predicted alpha value for the current pixel using the candidate predicted alpha value and the alpha channel lower bound, obtaining a residual alpha value as a difference of subtracting the adjusted predicted alpha value from the input alpha channel value, and including the residual alpha value in an output bitstream.

Another aspect is an apparatus for image coding using alpha channel prediction. The apparatus may include a processor configured to generate a reconstructed image using alpha channel prediction and output the reconstructed image. The processor may be configured to generate the reconstructed image using alpha channel prediction by obtaining reconstructed color channel values for a current pixel of the current image expressed with reference to first color space, obtaining color space converted color channel values for the current pixel by converting the reconstructed color channel values to a second color space, obtaining an alpha channel lower bound for an alpha channel value for the current pixel using the color space converted color channel values, generating a candidate predicted alpha value for the current pixel, obtaining an adjusted predicted alpha value for the current pixel using the candidate predicted alpha value and the alpha channel lower bound, generating a reconstructed pixel for the current pixel using the adjusted predicted alpha value, and including the reconstructed pixel in the reconstructed image.

Another aspect is an apparatus for image coding using alpha channel prediction. The apparatus may include a processor configured to generate an encoded image using alpha channel prediction and output the encoded image in an output bitstream. The processor may be configured to generate the encoded image using alpha channel prediction by identifying a current pixel from an input image, wherein the current pixel includes input color channel values, wherein the input color channel values are expressed with reference to first color space, and wherein the input color channel values include an input alpha channel value, obtaining pre-multiplied color channel values for the pixel using the input color channel values, obtaining reconstructed color values for the pixel using the pre-multiplied color channel values, wherein the reconstructed color channel values are expressed with reference to second color space, obtaining color space converted color channel values for the current pixel by color space converting the reconstructed color channel values to the first color space, obtaining an alpha channel lower bound for a reconstructed alpha channel value for the current pixel using the color space converted color channel values, generating a candidate predicted alpha value for the current pixel, obtaining an adjusted predicted alpha value for the current pixel using the candidate predicted alpha value and the alpha channel lower bound, obtaining a residual alpha value as a difference of subtracting the adjusted predicted alpha value from the input alpha channel value, and including the residual alpha value in an output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

Implementations of coding, such as encoding or decoding, using alpha channel prediction may include using previously reconstructed alpha pre-multiplied RGB color values to obtain an alpha channel lower bound, and using the alpha channel lower bound to improve the accuracy of a predictor for the alpha channel.

Figure 1:
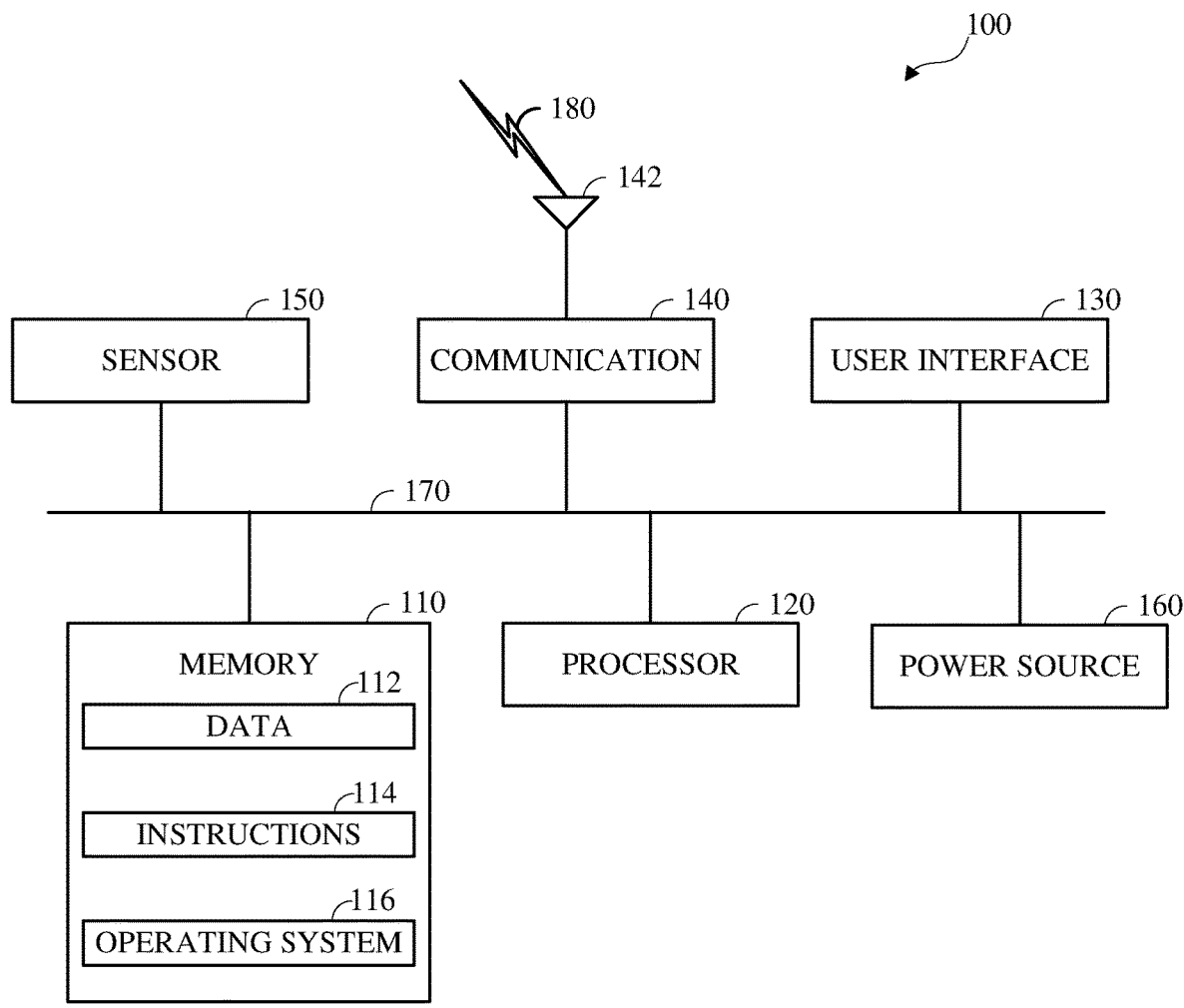
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
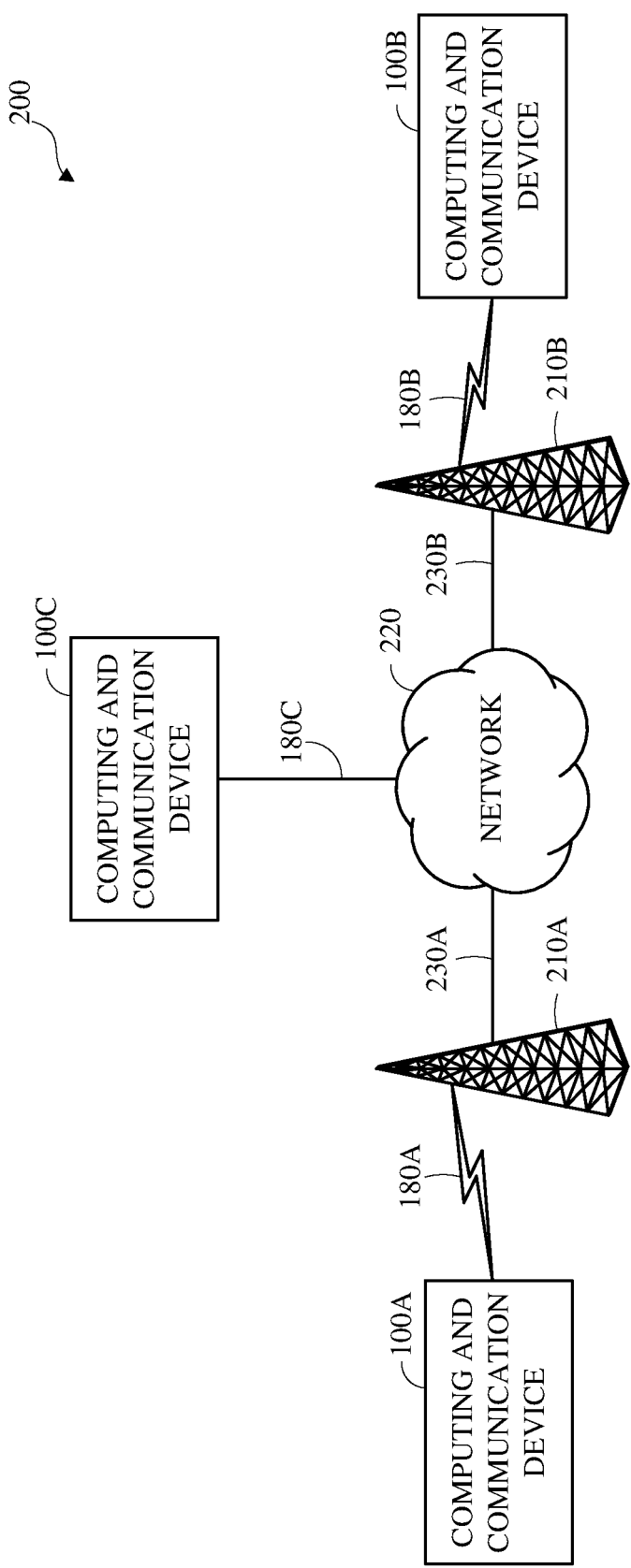
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
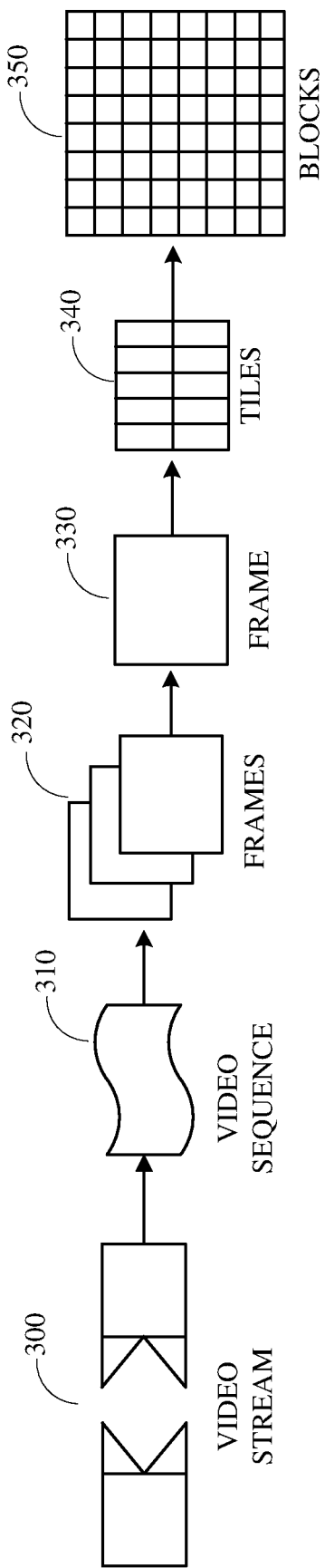
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
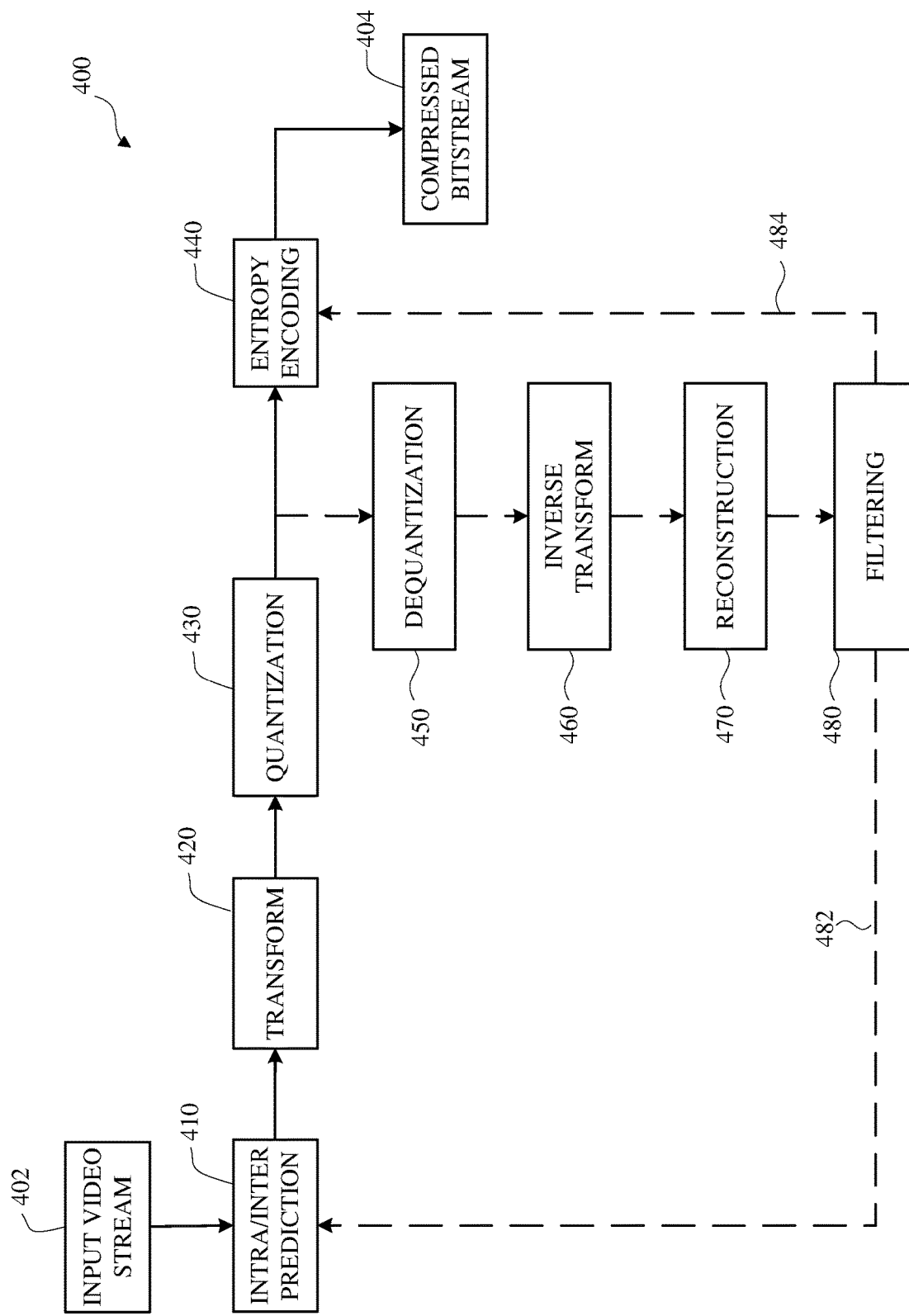
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
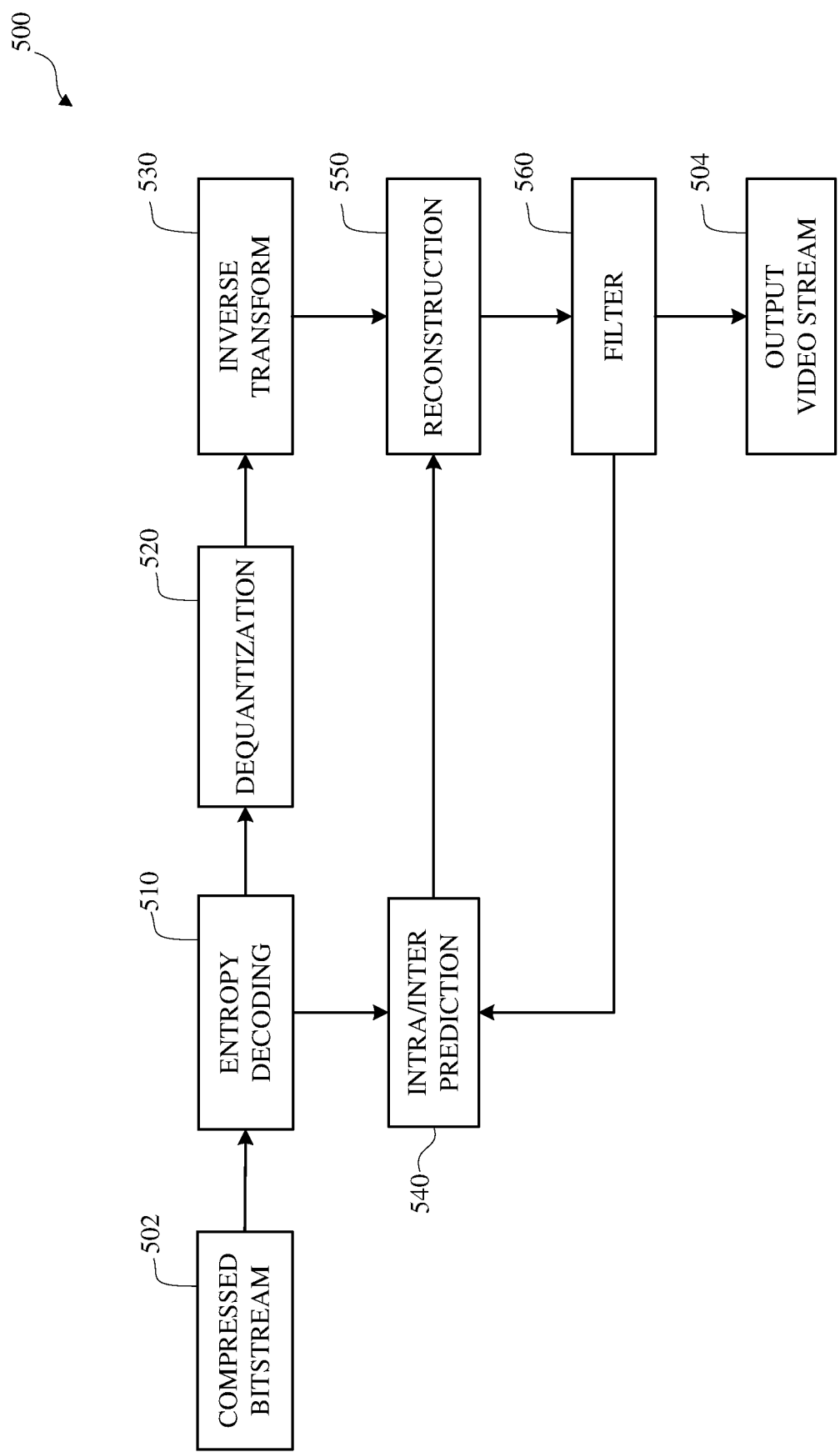
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without a deblocking filtering unit.

Figure 6:
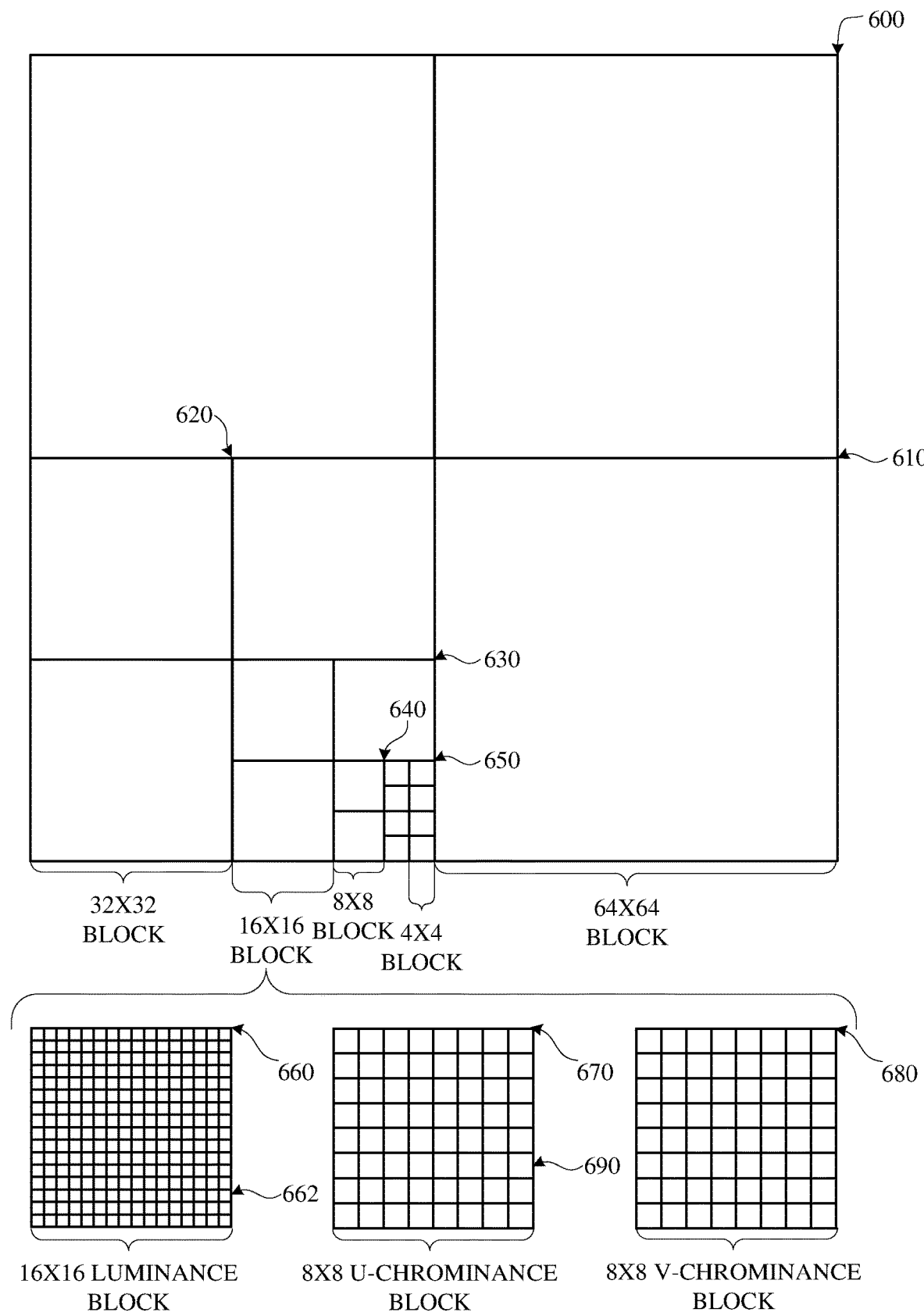
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
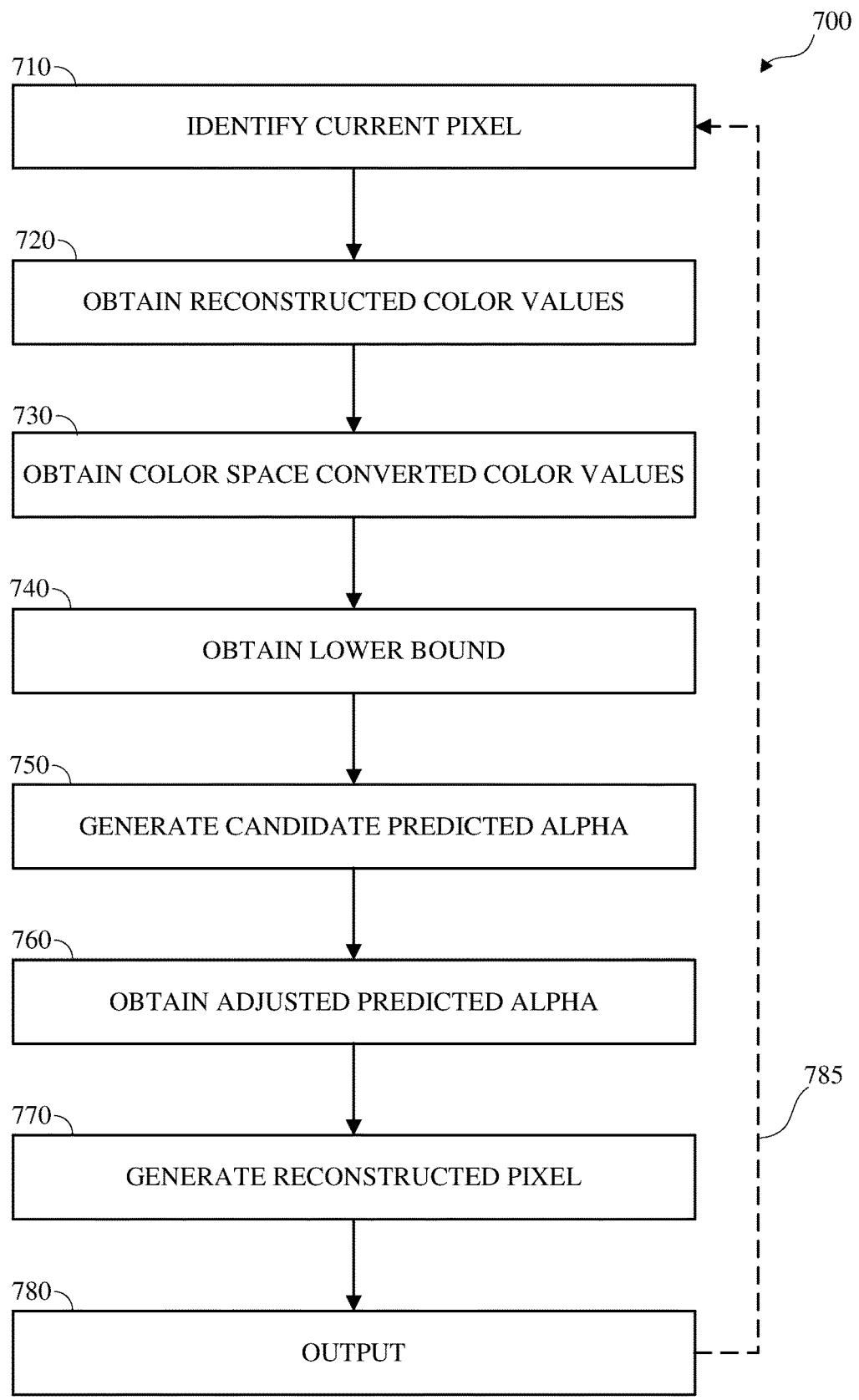
FIG. 7 is a flowchart diagram of an example of decoding using alpha channel prediction in accordance with implementations of this disclosure

FIG. 7 is a flowchart diagram of an example of decoding using alpha channel prediction 700 in accordance with implementations of this disclosure. Decoding using alpha channel prediction 700 may be implemented in a decoder, such as the decoder 500 shown in FIG. 5.

As shown in FIG. 7, decoding using alpha channel prediction 700 includes identifying a current pixel at 710, obtaining reconstructed color values at 720, obtaining color space converted color values at 730, obtaining an alpha channel lower bound at 740, generating a predicted alpha channel value at 750, obtaining an adjusted predicted alpha channel value at 760, generating a reconstructed pixel at 770, and outputting at 780.

Although not expressly shown in FIG. 7, decoding using alpha channel prediction 700 may include obtaining, such as receiving via a wired or wireless electronic communication medium, such as the network 220 shown in FIG. 2, or reading from an electronic data storage medium, such as the memory 110 shown in FIG. 1, at least a portion of an encoded bitstream. Decoding using alpha channel prediction 700 may include generating a reconstructed image. Generating the reconstructed image may include generating the reconstructed image using alpha channel prediction.

A current pixel may be identified at 710. The current pixel may be a pixel of a current block of the current image, such as block 610 shown in FIG. 6.

Reconstructed color channel values may be obtained for the current pixel at 720. For example, obtaining the reconstructed color channel values for the current pixel may include obtaining the reconstructed color channel values for the current pixel expressed in a color model based on a luminance component (Y) and two chrominance components (U and V or Cb and Cr), which may be referred to as the YUV or YCbCr color model, or color space. Obtaining the reconstructed color channel values may include reconstructing the reconstructed color channel values using data, such as residual color channel values, decoded from the encoded bitstream. The data decoded from the encoded bitstream may be losslessly coded data or lossily coded data.

Color space converted color values for the pixel may be obtained at 730. Obtaining the color space converted color values for the pixel may include color space conversion of the reconstructed color channel values, such as from the YUV color space to another color space, such as the RGB color space, which may include a red color channel (R), a green color channel (G), and a blue color channel (B).

An alpha channel lower bound may be obtained at 740. In some implementations, the alpha channel lower bound may be an approximate alpha channel lower bound, such as in accordance with obtaining the alpha channel lower bound using lossily coded data. Obtaining the alpha channel lower bound may include obtaining a normalized red color channel value by dividing the red color channel value (R) by a defined maximum value for the red color channel (maxR). Obtaining the alpha channel lower bound may include obtaining a normalized green color channel value by dividing the green color channel value (G) by a defined maximum value for the green color channel (maxG). Obtaining the alpha channel lower bound may include obtaining a normalized blue color channel value by dividing the blue color channel value (B) by a defined maximum value for the blue color channel (maxB). Obtaining the alpha channel lower bound may include identifying a maximum value among the normalized red color channel value, the normalized green color channel value, and the normalized blue color channel value, identifying, as the approximate lower bound, a product of multiplying the maximum value among the normalized red color channel value, the normalized green color channel value, and the normalized blue color channel value by a defined maximum value for the alpha channel (maxA). Obtaining the alpha channel lower bound (minA) may be expressed as the following:

$$\min\!A = \max\!\left(\frac{R}{\max\!R}, \frac{G}{\max\!G}, \frac{B}{\max\!B}\right) * \max\!A.$$

In some implementations, normalization may be omitted and obtaining the alpha channel lower bound (minA) may be expressed as minA=max(R, G, B).

A candidate predicted alpha channel value may be generated at 750. Generating the candidate predicted alpha channel value (rpredA) may include using the alpha values of one or more reconstructed context pixels, such as pixels from blocks above, to the left of, and above and to the left of the current block. For example, the candidate predicted alpha channel value may be an average of the alpha channel values of the context pixels.

An adjusted predicted alpha channel value may be obtained at 760 using the candidate predicted alpha channel value identified at 750 and the alpha channel lower bound identified at 740. Obtaining the adjusted predicted alpha channel value (predA) may be expressed as predA=max (rpredA, minA). In some implementations, obtaining the adjusted predicted alpha channel value (predA) may include using lossy compression based alpha channel lower bound adjustment (m), such as an adjustment based on the data lost in the lossy compression, such as based on a quantization level, and obtaining the adjusted predicted alpha channel value (predA) may be expressed as predA=max(rpredA, minA−m).

A reconstructed pixel may be generated at 770. Generating the reconstructed pixel may include generating a reconstructed alpha channel value for the pixel. Generating the reconstructed alpha channel value may include obtaining, as the reconstructed alpha channel value, a sum of adding the adjusted predicted alpha channel value and a decoded residual alpha channel value for the pixel.

The reconstructed block pixel may be output at 780. For example, the reconstructed pixel may be included in the reconstructed image, and the reconstructed image may be output, such as via the output stream 504 shown in FIG. 5, such as for presentation to a user. Although not shown expressly in FIG. 7, generating the reconstructed block or the reconstructed image may include filtering, such as the filtering shown at 560 in FIG. 5.

Figure 8:
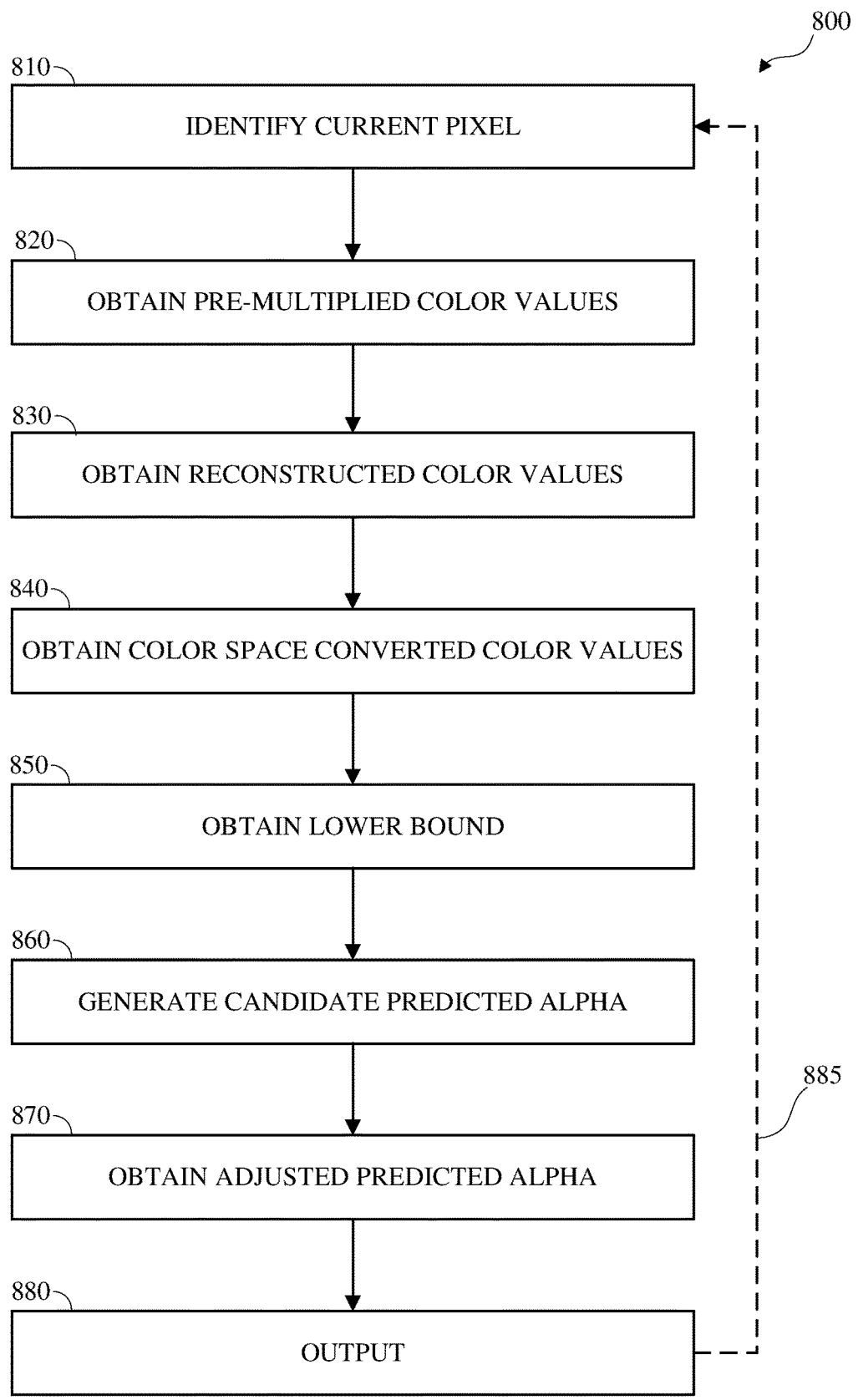
FIG. 8 is a flowchart diagram of an example of encoding using alpha channel prediction in accordance with implementations of this disclosure.

FIG. 8 is a flowchart diagram of an example of encoding using alpha channel prediction 800 in accordance with implementations of this disclosure. Encoding using alpha channel prediction 800 may be implemented in an encoder, such as the encoder 400 shown in FIG. 4. Encoding using alpha channel prediction 800 may be similar to decoding using alpha channel prediction 700 as shown in FIG. 7, except as is described herein or as is otherwise clear from context.

As shown in FIG. 8, encoding using alpha channel prediction 800 includes identifying a current pixel at 810, obtaining pre-multiplied color values at 820, obtaining reconstructed color values at 830, obtaining color space converted color values at 840, obtaining an alpha channel lower bound at 850, generating a predicted alpha channel value at 860, obtaining an adjusted predicted alpha channel value at 860, generating a reconstructed pixel at 870, and outputting at 870.

Although not expressly shown in FIG. 8, encoding using alpha channel prediction 800 may include obtaining a current image, which may be an input image.

A current pixel may be identified at 810. The current pixel may be a pixel of a current block of the current image, such as block 610 shown in FIG. 6.

Pre-multiplied color values for the pixel may be obtained at 820. For example, the pixel may be expressed in the input image using the RGB color space, which may include a red color channel (R), a green color channel (G), and a blue color channel (B), and an alpha channel (A). Obtaining the pre-multiplied color values may include identifying a product of multiplying the red color channel value by the alpha channel value as the pre-multiplied red color channel value, identifying a product of multiplying the green color channel value by the alpha channel value as the pre-multiplied green color channel value, and identifying a product of multiplying the blue color channel value by the alpha channel value as the pre-multiplied blue color channel value. Obtaining the pre-multiplied color values may include obtaining a normalized alpha channel value and using the normalized alpha channel value to obtain the pre-multiplied color channel values. Obtaining the normalized alpha channel value may include obtain a result of dividing the input alpha channel value by a maximum alpha channel value. In some implementations, the input color channel values for the pixel may be pre-multiplied color values.

Reconstructed color channel values may be obtained for the current pixel at 830. Although not shown separately in FIG. 8, the pre-multiplied color values may be encoded, and the reconstructed color channel values may be obtained by decoding the encoded data for the pre-multiplied color values. Encoding the pre-multiplied color values may include color space conversion of the pre-multiplied color values, such as from the RGB color space to a color model based on a luminance component (Y) and two chrominance components (U and V or Cb and Cr), which may be referred to as the YUV or YCbCr color model, or color space. The encoded data may be losslessly coded data or lossily coded data.

Color space converted reconstructed color values for the pixel may be obtained at 840. Obtaining the color space converted reconstructed color values for the pixel may include color space conversion of the reconstructed color channel values, such as from the YUV color space to another color space, such as the RGB color space.

An alpha channel lower bound, which may be an approximate lower bound, may be obtained at 850. Obtaining the alpha channel lower bound may include obtaining a normalized red color channel value by dividing the red color space converted reconstructed color value (R) by a defined maximum value for the red color channel (maxR). Obtaining the alpha channel lower bound may include obtaining a normalized green color channel value by dividing the green color space converted reconstructed color value (G) by a defined maximum value for the green color channel (maxG). Obtaining the alpha channel lower bound may include obtaining a normalized blue color channel value by dividing the blue color space converted reconstructed color value (B) by a defined maximum value for the blue color channel (maxB). Obtaining the alpha channel lower bound may include identifying a maximum value among the normalized red color channel value, the normalized green color channel value, and the normalized blue color channel value, identifying, as the approximate lower bound, a product of multiplying the maximum value among the normalized red color channel value, the normalized green color channel value, and the normalized blue color channel value by a defined maximum value for the alpha channel (maxA). Obtaining the alpha channel lower bound (minA) may be expressed as the following:

$$\min A = \max\left(\frac{R}{\max R}, \frac{G}{\max G}, \frac{B}{\max B}\right) * \max A.$$

In some implementations, normalization may be omitted and obtaining the alpha channel lower (minA) bound may be expressed as minA=max(R, G, B).

A predicted alpha channel value may be generated at 860. Generating the predicted alpha channel value (rpredA) may include using the alpha values of one or more reconstructed context pixels, such as pixels from blocks above, to the left of, and above and to the left of the current block. For example, the predicted alpha channel value may be an average of the alpha channel values of the context pixels.

An adjusted predicted alpha channel value may be obtained at 870 using the candidate predicted alpha value identified at 860 and the alpha channel lower bound identified at 850. Obtaining the adjusted predicted alpha channel value (predA) may be expressed as predA=max(rpredA, minA).

The encoded image data may be output at 880. Although not shown separately in FIG. 8, the adjusted predicted alpha channel value obtained at 870 may be subtracted from the input pixel alpha value to obtain a residual alpha value, and the residual alpha value may be included in the output bitstream.

In some implementations, the residual alpha value may be an alpha channel lower bound restricted residual alpha value wherein, for a residual alpha value less than the alpha channel lower bound, the alpha channel lower bound may be used as the residual alpha value. In some implementations, such as in accordance with obtaining the alpha channel lower bound using lossily coded data, an approximation of the alpha channel lower bound wherein, for a residual alpha value less than the approximation of the alpha channel lower bound, the approximation of the alpha channel lower bound may be used as the residual alpha value. The approximation of the alpha channel lower bound may be a product of multiplying the alpha channel lower bound by a defined approximation parameter, such as 0.9.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A non-transitory computer-readable storage medium storing instructions that are executed by a processor to perform decoding using alpha channel prediction, decoding using alpha channel prediction comprising:
- generating a reconstructed image, wherein generating the reconstructed image includes generating the reconstructed image using alpha channel prediction, wherein generating the reconstructed image using alpha channel prediction includes:
  - obtaining reconstructed color channel values for a current pixel of the current image expressed with reference to first color space;
  - obtaining color space converted color channel values for the current pixel by converting the reconstructed color channel values to a second color space;
  - obtaining an alpha channel lower bound for an alpha channel value for the current pixel using the color space converted color channel values;
  - generating a candidate predicted alpha value for the current pixel;
  - obtaining an adjusted predicted alpha value for the current pixel using the candidate predicted alpha value and the alpha channel lower bound;
  - generating a reconstructed pixel for the current pixel using the adjusted predicted alpha value; and
  - including the reconstructed pixel in the reconstructed image; and
- outputting the reconstructed image.

2. The non-transitory computer-readable storage medium of claim 1, wherein:
- the first color space is the YUV color space;
- the reconstructed color channel values include a luminance channel value, a first chrominance channel value, and a second chrominance channel value; and
- obtaining the reconstructed color channel values includes decoding residual color channel values from an encoded bitstream.

3. The non-transitory computer-readable storage medium of claim 1, wherein the second color space is the RGB color space and the color space converted color channel values include a red color channel value, a green color channel value, and a blue color channel value.

4. The non-transitory computer-readable storage medium of claim 3, wherein obtaining the alpha channel lower bound includes:
- obtaining a normalized red color channel value by dividing the red color channel value by a defined maximum value for the red color channel;
- obtaining a normalized green color channel value by dividing the green color channel value by a defined maximum value for the green color channel;
- obtaining a normalized blue color channel value by dividing the blue color channel value by a defined maximum value for the blue color channel;
- identifying a maximum value among the normalized red color channel value, the normalized green color channel value, and the normalized blue color channel value; and
- identifying, as the alpha channel lower bound, a product of multiplying the maximum value by a defined maximum value for the alpha channel.

5. The non-transitory computer-readable storage medium of claim 1, wherein generating the candidate predicted alpha value includes:
- identifying a previously reconstructed context pixel for predicting the candidate predicted alpha value; and
- obtaining the candidate predicted alpha value using the previously reconstructed context pixel.

6. The non-transitory computer-readable storage medium of claim 1, wherein obtaining the adjusted predicted alpha value includes:
- identifying, as the adjusted predicted alpha value, a maximum value among the candidate predicted alpha value and the alpha channel lower bound.

7. A non-transitory computer-readable storage medium storing instructions that are executed by a processor to perform encoding using alpha channel prediction, encoding using alpha channel prediction comprising:
- generating an encoded image, wherein generating the encoded image includes generating the encoded image using alpha channel prediction, wherein generating the encoded image using alpha channel prediction includes:
  - identifying a current pixel from an input image, wherein the current pixel includes input color channel values, wherein the input color channel values are expressed with reference to first color space, and wherein the input color channel values include an input alpha channel value;
  - obtaining pre-multiplied color channel values for the pixel using the input color channel values;
  - obtaining reconstructed color values for the pixel using the pre-multiplied color channel values, wherein the reconstructed color channel values are expressed with reference to second color space;
  - obtaining color space converted color channel values for the current pixel by color space converting the reconstructed color channel values to the first color space;
  - obtaining an alpha channel lower bound for a reconstructed alpha channel value for the current pixel using the color space converted color channel values;
  - generating a candidate predicted alpha value for the current pixel;
  - obtaining an adjusted predicted alpha value for the current pixel using the candidate predicted alpha value and the alpha channel lower bound;
  - obtaining a residual alpha value as a difference of subtracting the adjusted predicted alpha value from the input alpha channel value; and
  - including the residual alpha value in an output bitstream; and
- outputting the output bitstream.

8. The non-transitory computer-readable storage medium of claim 7, wherein the second color space is the YUV color space and the reconstructed color channel values include a luminance channel value, a first chrominance channel value, and a second chrominance channel value.

9. The non-transitory computer-readable storage medium of claim 7, wherein:
- the first color space is the RGB color space;
- the input color channel values include an input red color channel value, an input green color channel value, and an input blue color channel value;
- the pre-multiplied color channel values include a pre-multiplied red color channel value, a pre-multiplied green color channel value, and a pre-multiplied blue color channel value; and
- the color space converted color channel values include a color space converted red color channel value, a color space converted green color channel value, and a color space converted blue color channel value.

10. The non-transitory computer-readable storage medium of claim 9, wherein obtaining the pre-multiplied color channel values includes:
  obtaining, as the pre-multiplied red color channel value, a product of multiplying the input red color channel value by the input alpha channel value;
  obtaining, as the pre-multiplied green color channel value, a product of multiplying the input green color channel value by the input alpha channel value; and
  obtaining, as the pre-multiplied blue color channel value, a product of multiplying the input blue color channel value by the input alpha channel value.

11. The non-transitory computer-readable storage medium of claim 9, wherein obtaining the alpha channel lower bound includes:
  obtaining a normalized red color channel value by dividing the color space converted red color channel value by a defined maximum value for the red color channel;
  obtaining a normalized green color channel value by dividing the color space converted green color channel value by a defined maximum value for the green color channel;
  obtaining a normalized blue color channel value by dividing the color space converted blue color channel value by a defined maximum value for the blue color channel;
  identifying a maximum value among the normalized red color channel value, the normalized green color channel value, and the normalized blue color channel value; and
  identifying, as the alpha channel lower bound, a product of multiplying the maximum value by a defined maximum value for the alpha channel.

12. The non-transitory computer-readable storage medium of claim 7, wherein obtaining the reconstructed color values includes:
  color space converting the pre-multiplied color channel values to the second color space;
  obtaining respective predicted color channel values for the pre-multiplied color channel values;
  obtaining respective residual color channel values as respective differences of subtracting the predicted color channel values from the corresponding pre-multiplied color channel values;
  lossily encoding the residual color channel values to obtain encoded residual color channel values; and
  obtaining, as the reconstructed color values, respective sums of adding the encoded residual color channel values to the corresponding predicted color channel values.

13. An apparatus comprising:
  a memory storing instructions; and
  a processor that executes the instructions to:
    use alpha channel prediction to generate an encoded image, wherein, to use alpha channel prediction to generate the encoded image, the processor executes the instructions to:
      identify a current pixel from an input image, wherein the current pixel includes input color channel values, wherein the input color channel values are expressed with reference to first color space, and wherein the input color channel values include an input alpha channel value;
      obtain pre-multiplied color channel values for the pixel in accordance with the input color channel values;
      obtain reconstructed color values for the pixel in accordance with the pre-multiplied color channel values, wherein the reconstructed color channel values are expressed with reference to second color space;
      obtain color space converted color channel values for the current pixel, wherein, to obtain the color space converted color channel value, the processor executes the instruction to color space convert the reconstructed color channel values to the first color space;
      obtain an alpha channel lower bound for a reconstructed alpha channel value for the current pixel in accordance with the color space converted color channel values;
      generate a candidate predicted alpha value for the current pixel;
      obtain an adjusted predicted alpha value for the current pixel in accordance with the candidate predicted alpha value and the alpha channel lower bound;
      obtain a residual alpha value as a difference of a subtraction of the adjusted predicted alpha value from the input alpha channel value; and
      include the residual alpha value in an output bitstream; and
    output the output bitstream.

14. The apparatus of claim 13, wherein the second color space is the YUV color space and the reconstructed color channel values include a luminance channel value, a first chrominance channel value, and a second chrominance channel value.

15. The apparatus of claim 13, wherein:
  the first color space is the RGB color space;
  the input color channel values include an input red color channel value, an input green color channel value, and an input blue color channel value;
  the pre-multiplied color channel values include a pre-multiplied red color channel value, a pre-multiplied green color channel value, and a pre-multiplied blue color channel value; and
  the color space converted color channel values include a color space converted red color channel value, a color space converted green color channel value, and a color space converted blue color channel value.

16. The apparatus of claim 15, wherein, to obtain the pre-multiplied color channel values, the processor executes the instructions to:
  obtain, as the pre-multiplied red color channel value, a product of a multiplication of the input red color channel value by the input alpha channel value;
  obtain, as the pre-multiplied green color channel value, a product of a multiplication of the input green color channel value by the input alpha channel value; and
  obtain, as the pre-multiplied blue color channel value, a product of a multiplication of the input blue color channel value by the input alpha channel value.

17. The apparatus of claim 15, wherein, to obtain the alpha channel lower bound, the processor executes the instructions to:
  obtain a normalized red color channel value by division of the color space converted red color channel value by a defined maximum value for the red color channel;
  obtain a normalized green color channel value by division of the color space converted green color channel value by a defined maximum value for the green color channel;

obtain a normalized blue color channel value by division of the color space converted blue color channel value by a defined maximum value for the blue color channel;

identify a maximum value among the normalized red color channel value, the normalized green color channel value, and the normalized blue color channel value; and identify, as the alpha channel lower bound, a product of a multiplication of the maximum value by a defined maximum value for the alpha channel.

18. The apparatus of claim 13, wherein, to obtain the reconstructed color values, the processor executes the instructions to:

color space convert the pre-multiplied color channel values to the second color space;

obtain respective predicted color channel values for the pre-multiplied color channel values;

obtain respective residual color channel values as respective differences of a subtraction of the predicted color channel values from the corresponding pre-multiplied color channel values;

lossily encode the residual color channel values to obtain encoded residual color channel values; and obtain, as the reconstructed color values, respective sums of an addition of the encoded residual color channel values and the corresponding predicted color channel values.

19. The apparatus of claim 13, wherein, to generate the candidate predicted alpha value, the processor executes the instructions to:

identify a previously reconstructed context pixel for prediction of the candidate predicted alpha value; and obtain the candidate predicted alpha value in accordance with the previously reconstructed context pixel.

20. The apparatus of claim 13, wherein, to obtain the adjusted predicted alpha value, the processor executes the instructions to:

identify, as the adjusted predicted alpha value, a maximum value among the candidate predicted alpha value and the alpha channel lower bound.

* * * * *